P. CATUCCI.
VERTICAL SPINDLE BEARING.
APPLICATION FILED APR. 26, 1917.
1,263,205.
Patented Apr. 16, 1918.
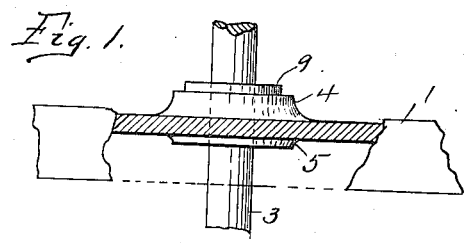
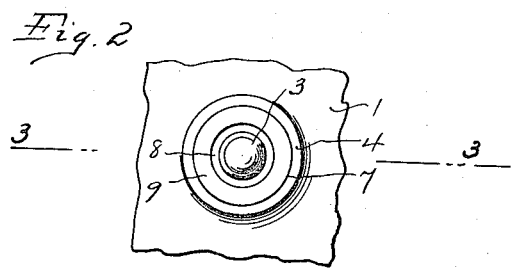
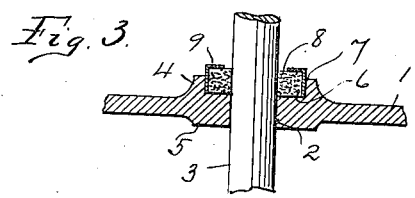
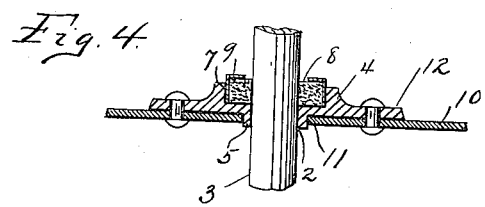
Pliny Catucci INVENTOR.
BY
Louis M. Sanders ATTORNEY

UNITED STATES PATENT OFFICE.

PLINY CATUCCI, OF NEWARK, NEW JERSEY, ASSIGNOR, BY MESNE ASSIGNMENTS, TO OTTO HEINEMAN PHONOGRAPH SUPPLY CO., INC., OF NEW YORK, N. Y., A CORPORATION OF NEW YORK.

VERTICAL-SPINDLE BEARING.

1,263,205.     Specification of Letters Patent.     Patented Apr. 16, 1918.

Application filed April 26, 1917. Serial No. 164,597.

*To all whom it may concern:*

Be it known that I, PLINY CATUCCI, a citizen of the United States, residing in the city of Newark, county of Essex, and State of New Jersey, have invented certain new and useful Improvements in Vertical-Spindle Bearings, of which the following is a specification.

My invention is more particularly adapted for use in connection with the driving spindles of talking machine motors, but from the nature of its structure, the bearing is capable of use in many other relations.

Hitherto it has been the practice of motor manufacturers to provide a simple aperture through the upper motor plate as a bearing for the turntable spindle, sometimes providing an additional bushing of hardened metal in such aperture, but more often the metal of the plate itself is relied upon solely as the bearing surface. The difficulty with such a construction lies in the fact that no provision is made for retaining a lubricant for the bearing and since the aperture through the motor plate is vertical, any liquid lubricant soon trickles down the spindle, leaving the bearing to "run dry". When the motor is in fairly constant use, such a bearing requires constant attention and frequent lubrication to obtain the best results.

The object of my invention, therefore is to provide an improved vertical spindle bearing of such a character as to contain means within itself for retaining a supply of lubricant sufficient for the purpose and yet not add materially to the cost of the structure.

Improvement in spring motors, in the last few years has been confined to matters of detail and refinement, in the direction of simplicity of structure and durability, as well as accuracy and uniformity of speed, and my present improvement is but one step in this direction.

In carrying out my invention I provide a structure substantially as illustrated in the accompanying drawings wherein—

Figure 1, is a side elevation, partly broken away, of a part of a motor frame, showing my improved spindle bearing.

Fig. 2, is a plan view of the same.

Fig. 3, is a cross section on line 3—3 of Fig. 2.

Fig. 4 illustrates a slight modification.

Similar reference numerals refer to like parts throughout the specification and drawings.

In the drawings I have only shown so much of the motor plate or frame as will suffice to show the application of my improvement.

The frame or plate 1, may be of cast iron or any suitable material and is provided with the vertical aperture 2, therein to receive the vertical driving spindle 3. Integral with the frame, are the upper and lower bosses 4, and 5, as shown. The upper boss 4, is counterbored as at 6, to provide an enlarged recess 7, into which is fitted a felt washer 8, which is centrally apertured for the passage of the spindle 3. Fitted into this recess 7, and partially covering the washer 8, is the inverted cup shaped cap 9, which, when in place, serves to retain the felt washer in position, and prevent its displacement. The washer, in practice, is inserted into the cap 9, which is then forced into the recess 7. Liquid lubricant may then be applied to the felt, to the point of saturation without fear of its following on down the spindle and leaving a dry bearing, since the felt washer serves as a reservoir to retain the lubricant, and supply it to the bearing in just sufficient quantity at all times to afford an easy running bearing.

In the modification shown in Fig. 4, the upper plate 10, is of sheet metal provided with an enlarged opening 11, into which is fitted and secured the flanged bushing bearing 12. The other parts of the structure, however are substantially the same as that hitherto described as for example, the upper and lower bosses 4, and 5, the aperture 2, recess 7, felt washer 8, and cap 9.

It will thus be seen that my improved bearing affords an ample reservoir for lubricant and is provided with means for retaining it without material loss or escape for a long time, thereby removing two of the common drawbacks of the common spring motor—constant attention and frequent lubrication.

As above indicated, my improved bearing may be used wherever a vertical shaft is used without sacrificing any of the advantages set forth.

I claim:

1. In a spindle bearing, the combination of a frame or plate having a counterbored, apertured recess therein, a lubricant retaining washer fitted into the counterbored recess and a spindle in said aperture, and an inverted cup shaped cap frictionally secured in said counterbored recess for holding said washer against displacement therefrom.

2. In a vertical spindle bearing, the combination of a vertically disposed spindle, an apertured support in which said spindle is mounted, said support having a counterbored recess concentric with said spindle, and a lubricant retaining washer fitted into said recess and surrounding said spindle, and an inverted cup shaped cap frictionally secured in said counterbored recess for holding said washer against displacement therefrom.

PLINY CATUCCI.